United States Patent
Forlines (10) Patent No.: US 10,845,897 B2
(45) Date of Patent: Nov. 24, 2020

(54) TOUCH SURFACES USING STYLUS AND TOUCH

(71) Applicant: Tactual Labs Co., New York, NY (US)

(72) Inventor: Clifton Forlines, Cape Elizabeth, ME (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/383,799

(22) Filed: Apr. 15, 2019

(65) Prior Publication Data

US 2019/0317615 A1    Oct. 17, 2019

Related U.S. Application Data

(60) Provisional application No. 62/657,142, filed on Apr. 13, 2018.

(51) Int. Cl.
*G06F 3/0354* (2013.01)
*G06F 3/041* (2006.01)

(52) U.S. Cl.
CPC .......... *G06F 3/03545* (2013.01); *G06F 3/041* (2013.01)

(58) Field of Classification Search
CPC ........................... G06F 3/03545; G06F 3/041
See application file for complete search history.

(56) References Cited

U.S. PATENT DOCUMENTS

| | | | | |
|---|---|---|---|---|
| 2009/0251434 A1* | 10/2009 | Rimon | ...................... | G06F 1/30 345/173 |
| 2010/0155153 A1* | 6/2010 | Zachut | ................ | G06F 3/03545 178/18.03 |
| 2011/0181524 A1* | 7/2011 | Hinckley | ............ | G06F 3/04883 345/173 |
| 2012/0050207 A1* | 3/2012 | Westhues | ............ | G06F 3/03545 345/174 |
| 2014/0306909 A1* | 10/2014 | Pedersen | ............. | G06F 3/03545 345/173 |
| 2014/0340351 A1* | 11/2014 | Forlines | .................. | G06F 3/044 345/174 |
| 2015/0301651 A1* | 10/2015 | Leigh | .................. | G02F 1/13338 345/174 |
| 2015/0346875 A1* | 12/2015 | Yeh | ...................... | G06F 3/03545 345/174 |

* cited by examiner

*Primary Examiner* — Ariel A Balaoing
(74) *Attorney, Agent, or Firm* — Adam Landa (57) ABSTRACT

A touch display has conductors that are able to determine measurements of signals received due to touch events with a user's hand. The touch display is also able to determine measurements of signals received due to interaction with a stylus. Additionally the touch display is able to discriminate interactions between the hand holding the stylus and the free hand. Interactions with the touch display between all three may be measured and discriminated simultaneously.

16 Claims, 6 Drawing Sheets

TOUCH SURFACES USING STYLUS AND TOUCH

This application claims the benefit of U.S. Provisional Application Ser. No. 62/657,142 filed Apr. 13, 2018, the contents of which are hereby incorporated by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems relate in general to the field of user input, and in particular to devices sensitive to touch, including, hover and pressure.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

This application relates to user interfaces such as found in U.S. patent application Ser. No. 15/195,675, entitled "Frame-Phase Synchronization in Frequency Division Modulated Touch Systems." The entire disclosure of that application, and the applications incorporated therein by reference, are incorporated herein by reference. Familiarity with the concepts and terms therein is presumed.

In various embodiments, the present disclosure is directed to systems (e.g., objects, panels) sensitive to hover, contact and pressure and their applications. It will be understood by one of ordinary skill in the art that the disclosures herein apply generally to all types of systems using fast multi-touch to detect hover, contact and pressure.

Throughout this disclosure, the terms "touch", "touches", "touch event", "contact", "contacts", "hover", or "hovers" or other descriptors may be used to describe events or periods of time in which a user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The presently disclosed systems and methods involve principles related to and for designing, manufacturing and using capacitive based sensors, and particularly capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosures of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

In an embodiment, a display implementing fast multi-touch sensors utilize a projected capacitive method that has been enhanced for high update rate and low latency measurements of touch events. The technique can use parallel hardware and higher frequency waveforms to gain the above advantages. Also disclosed are methods to make sensitive and robust measurements, which methods may be used on transparent display surfaces and which may permit economical manufacturing of products which employ the technique. In this regard, a "capacitive object" as used herein could be a finger, other part of the human body, a stylus, or any object to which the sensor is sensitive. The sensors and methods disclosed herein need not rely on capacitance. With respect to, e.g., an optical sensor, such embodiments utilize photon tunneling and leaking to sense a touch event, and a "capacitive object" as used herein includes any object, such as a stylus or finger, that is compatible with such sensing. Similarly, "touch locations" and "touch sensitive device" as used herein do not require actual touching contact between a capacitive object and the disclosed sensor.

Figure 1:
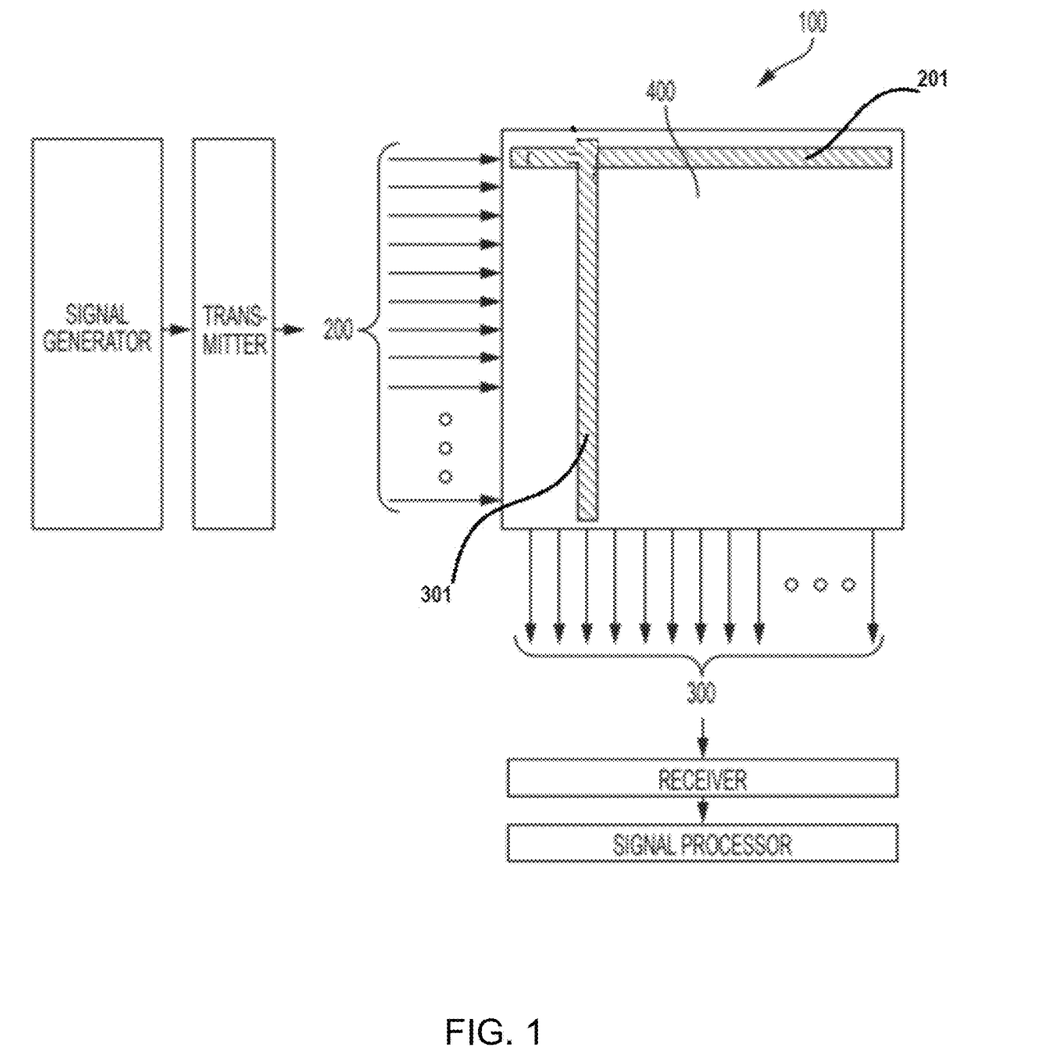
FIG. 1 is a high level block diagram illustrating an embodiment of a low-latency touch sensor device.

FIG. 1 illustrates certain principles of a fast multi-touch sensor 100 in accordance with an embodiment. At 200, a different signal is transmitted into each of the row conductors 201 of the touch surface 400. The signals are designed to be "orthogonal", i.e., separable and distinguishable from each other. At 300, a receiver is attached to each column conductor 301. The row conductors 201 and the column conductors 301 are conductors/antennas that are able to transmit and/or receive signals. The receiver is designed to receive any of the transmitted signals, or an arbitrary combination of them, with or without other signals and/or noise, and to individually determine a measure, e.g., a quantity for each of the orthogonal transmitted signals present on that column conductor 301. The touch surface 400 of the sensor comprises a series of row conductors 201 and column conductors 301 (not all shown), along which the orthogonal signals can propagate. In an embodiment, the row conductors 201 and column conductors 301 are arranged such that a touch event will cause a change in coupling between at least one of the row conductors and at least one of the column conductors. In an embodiment, a touch event will cause a change in the amount (e.g., magnitude) of a signal transmitted on a row conductor that is detected in the column conductor. In an embodiment, a touch event will cause a change in the phase of a signal transmitted on a row conductor that is detected on a column conductor. Because the touch sensor ultimately detects touch due to a change in the coupling, it is not of specific importance, except for reasons that may otherwise be apparent to a particular embodiment, the type of change that is caused to the touch-related coupling by a touch. As discussed above, the touch, or touch event does not require a physical touching, but rather an event that affects the coupled signal. In an embodiment the touch or touch event does not require a physical touching, but rather an event that affects the coupled signal in a repeatable or predictable manner.

With continued reference to FIG. 1, in an embodiment, generally, the result of a touch event in the proximity of both a row conductor 201 and column conductor 301 causes a change in the signal that is transmitted on a row conductor as it is detected on a column conductor. In an embodiment, the change in coupling may be detected by comparing successive measurements on the column conductor. In an embodiment, the change in coupling may be detected by comparing the characteristics of the signal transmitted on the row conductor to a measurement made on the column conductor. In an embodiment, a change in coupling may be measured by both by comparing successive measurements on the column conductor and by comparing known characteristics of the signal transmitted on the row conductor to a measurement made on the column conductor. More generally, touch events cause, and thus correspond to, measurements of the signals on the column conductors 301. Because the signals on the row conductors 201 are orthogonal, multiple row signals can be coupled to a column conductor 301 and distinguished by the receiver. Likewise, the signals on each row conductor 201 can be coupled to multiple column conductors 301. For each column conductor 301 coupled to a given row conductor 201 (and regardless of how touch affects the coupling between the row conductor and column conductor), the signals measured on the column conductor 301 contain information that will indicate which row conductors 201 are being touched simultaneously with that column conductor 301. The magnitude or phase shift of each signal received is generally related to the amount of coupling between the column conductor 301 and the row conductor 201 carrying the corresponding signal, and thus, may indicate a distance of the touching object to the surface, an area of the surface covered by the touch and/or the pressure of the touch.

In various implementations of a touch device, physical contact with the row conductors 201 and/or column conductors 301 is unlikely or impossible as there may be a protective barrier between the row conductors 201 and/or column conductors 301 and the finger or other object of touch. Moreover, generally, the row conductors 201 and column conductors 301 themselves are not in physical contact with each other, but rather, placed in a proximity that allows signal to be coupled there-between, and that coupling changes with touch. Generally, the row-column conductor coupling results not from actual contact between them, nor by actual contact from the finger or other object of touch, but rather, by the effect of bringing the finger (or other object) into proximity—which proximity results in a change of coupling, which effect is referred to herein as touch.

In an embodiment, the orientation of the row conductors and column conductors may vary as a consequence of a physical process, and the change in the orientation (e.g., movement) of the row conductors and/or column conductors with respect to one-another may cause a change in coupling. In an embodiment, the orientation of a row conductor and a column conductor may vary as a consequence of a physical process, and the range of orientation between the row conductor and column conductor includes ohmic contact, thus in some orientations within a range a row conductor and column conductor may be in physical contact, while in other orientations within the range, the row conductor and column conductor are not in physical contact and may have their coupling varied. In an embodiment, when a row conductor and column conductor are not in physical contact their coupling may be varied as a consequence of moving closer together or further apart. In an embodiment, when a row conductor and column conductor are not in physical contact their coupling may be varied as a consequence of grounding. In an embodiment, when a row conductor and column conductor are not in physical contact their coupling may be varied as a consequence of materials translated within the coupled field. In an embodiment, when a row conductor and column conductor are not in physical contact their coupling may be varied as a consequence of a changing shape of the row conductor or column conductor, or an antenna associated with the row conductor or column conductor.

The nature of the row conductors 201 and column conductors 301 is arbitrary and the particular orientation is variable. Indeed, the terms row conductor 201 and column conductor 301 are not intended to refer to a square grid, but rather to a set of conductors upon which signal is transmitted (rows) and a set of conductors onto which signal may be coupled (columns). (The notion that signals are transmitted on row conductors 201 and received on column conductors 301 itself is arbitrary, and signals could as easily be transmitted on conductors arbitrarily designated column conductors and received on conductors arbitrarily named row conductors, or both could arbitrarily be named something else.) Further, it is not necessary that row conductors and column conductors be in a grid. Other shapes are possible as long as a touch event will affect a row-column coupling. For example, the "rows" could be in concentric circles and the "columns" could be spokes radiating out from the center. And neither the "rows" nor the "columns" need to follow any geometric or spatial pattern, thus, for example, the keys on a keyboard could be arbitrarily connected to form row conductors and column conductors (related or unrelated to their relative positions.) Moreover, an antenna may be used as a row conductor, having a more defined shape than a simple conductor wire such as for example a row made from ITO). For example an antenna may be round or rectangular, or have substantially any shape, or a shape that changes. An antenna used as a row conductor may be oriented in proximity to one or more conductors, or one or more other antennas that act as columns. In other words, in an embodiment, an antenna may be used for signal transmission and oriented in proximity to one or more conductors, or one or more other antennas that are used to receive signals. A touch will change the coupling between the antenna used for signal transmission and the signal used to receive signals.

It is not necessary for there to be only two types signal propagation channels: instead of row conductors and column conductors, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna or conductors may be used rather than just "rows" and "columns." Many alternative embodiments are possible and will be apparent to a person of skill in the art after considering this disclosure.

It is likewise not necessary for there to be only one signal transmitted on each transmitting media. In an embodiment, multiple orthogonal signals are transmitted on each row. In an embodiment, multiple orthogonal signals are transmitted on each transmit antenna.

Returning briefly to FIG. 1, as noted above, in an embodiment the touch surface 400 comprises a series of row conductors 201 and column conductors 301, along which signals can propagate. As discussed above, the row conductors 201 and column conductors 301 are oriented so that, when they are not being touched the signals are coupled differently than when they are being touched. The change in signal coupled between them may be generally proportional or inversely proportional (although not necessarily linearly proportional) to the touch such that touch is measured as a gradation, permitting distinction between more touch (i.e., closer or firmer) and less touch (i.e., farther or softer)—and even no touch.

At 300, a receiver is attached to each column conductor 301. The receiver is designed to receive the signals present on the column conductors 301, including any of the orthogonal signals, or an arbitrary combination of the orthogonal signals, and any noise or other signals present. Generally, the receiver is designed to receive a frame of signals present on the column conductors 301, and to identify the columns providing signal. A frame of signals is received during an integration period or sampling period. In an embodiment, the receiver (or a signal processor associated with the receiver data) may determine a measure associated with the quantity of each of the orthogonal transmitted signals present on that column conductor 301 during the time the frame of signals was captured. In this manner, in addition to identifying the row conductors 201 in touch with each column conductor 301, the receiver can provide additional (e.g., qualitative) information concerning the touch. In general, touch events may correspond (or inversely correspond) to the received signals on the column conductors 301. For each column conductor 301, the different signals received thereon indicate which of the corresponding row conductors 201 is being touched simultaneously with that column conductor 301. In an embodiment, the amount of coupling between the corresponding row conductor 201 and column conductor 301 may indicate e.g., the area of the surface covered by the touch, the pressure of the touch, etc. In an embodiment, a change in coupling over time between the corresponding row conductor 201 and column conductor 301 indicates a change in touch at the intersection of the two.

The row conductor 201 and column conductor 301 setup shown in FIG. 1 provides the framework for the below discussion related to the interactive screen. In FIGS. 2-6, an interactive touch screen is shown that is able to accommodate interaction with a variety of interactive components in a seamless manner. Manipulation of the interactive components can occur without sacrificing the framerate of the touch screen. This seamless interactivity and at times simultaneous manipulation of interactive components and touch interfaces permits a broader spectrum of activity by the user.

In an embodiment, the touch screen may employ mixed signal integrated circuits. The mixed signal integrated circuits comprise a signal generator, transmitter, receiver and signal processor. In an embodiment, the mixed signal integrated circuit is adapted to generate one or more signals and send the signals to transmitting antennas. In an embodiment, the mixed signal integrated circuit is adapted to generate a plurality of frequency-orthogonal signals and send the plurality of frequency-orthogonal signals to the transmitting antenna. In an embodiment, the mixed signal integrated circuit is adapted to generate a plurality of frequency-orthogonal signals and send one or more of the plurality of frequency-orthogonal signals to each of a plurality of row conductors. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor of a mixed signal integrated circuit (or a downstream component or software) is adapted to determine at least one value representing each frequency orthogonal signal transmitted to a row conductor. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which could be an FFT) output comprises a bin for each frequency-orthogonal signal that is transmitted. In an embodiment, each DFT (which could be an FFT) bin comprises an in-phase (I) and quadrature (Q) component. In an embodiment, the sum of the squares of the I and Q components is used as a measure corresponding to signal strength for that bin. In an embodiment, the square root of the sum of the squares of the I and Q components is used as a measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event.

Figure 2:
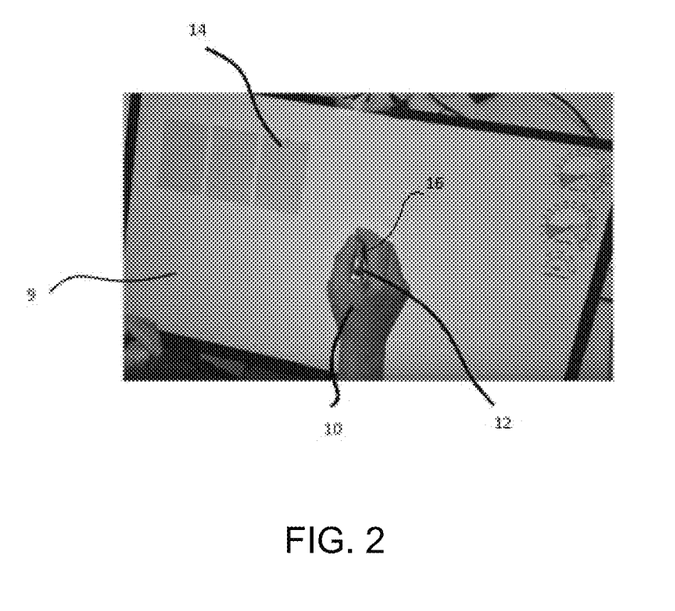
FIG. 2 shows an embodiment of a touch screen having interactive components.

Turning to FIG. 2, a touch display 9 is shown having interactive components 14. The interactive components 14 may be graphical user interfaces that are present on the touch display 9. In an embodiment, the interactive components are portions of the touch display 9 that are amenable to touch events, regardless of the graphical elements employed. The interactive components 14 shown in FIG. 2 are graphical elements that are in the form of notepads.

In an embodiment, the touch display 9 is comprised of row conductors and column conductors such as discussed above. In an embodiment, the touch display 9 is comprised of conductors arranged in a manner so that a touch event proximate to the conductors results is measured and processed by the touch display 9.

The interactive components 14 are able to be manipulated with the use of a stylus 12 and and/or hand 10. In an embodiment, the interactive components 14 shown are representations of, e.g., pieces of note paper. However, the interactive components 14 may effectively be any object that can be rendered graphically by a processor. In an embodiment, the interactive components 14 are 3D figures that are able to be manipulated through stylus and touch events. It should also be understood that the entire surface of the touch display 9 may be interacted with and not just the interactive components 14 displayed thereon. As mentioned above, the interactive components 14 shown in FIG. 2 are shown as pieces of note paper for the purpose of illustration only and other interactive components 14 may be implemented in their stead.

Still referring to FIG. 2, a stylus 12 is shown. The stylus 12 may be a passive, semi-passive or active stylus. In an embodiment, the stylus 12 includes a body that is at least partially conductive and has a conductive portion 16 so that when held by the hand 10 stylus 12 is able to interact electrically with the hand 10 via the conductive portion 16. In an embodiment the stylus 12 transmits a signal that is frequency orthogonal to each of the signals transmitted on the touch display 9. In an embodiment the stylus 12 transmits a plurality of signals that are frequency orthogonal to each of the signals transmitted on the touch display 9 and that are frequency orthogonal with respect to each other. In an embodiment the stylus 12 transmits a plurality of signals that are frequency orthogonal to each of the signals transmitted on the touch display 9 and that are frequency orthogonal with respect to each other wherein each of the signals are interpreted by the touch display as different color ink. In an embodiment, the user functions as a source of ground via the conductive portion 16 of the stylus 12. In an embodiment, the stylus transmits, i.e., infuses a signal into the user via the conductive portion 16 so that the user is an active transmitter of signal during use of the touch display 9.

The stylus 12 is able to transmit a signal through its nib that is able to be measured and used by a processor operable connected to the touch display 9 to provide interaction with and through the touch display 9. In an embodiment, the stylus 12 comprises a power source (not shown) and stylus signal generator (not shown) that is able to infuse a signal into the body of a user via the conductive portion 16 and thus infuse (a.k.a. inject) a stylus body signal into the hand 10 that is holding the stylus 12. In an embodiment, the stylus body signal transmits a unique frequency orthogonal signal that is different from each other frequency orthogonal signal that is transmitted by the conductors within the touch display 9 and the signal transmitted via the nib of the stylus 12. In an embodiment, the stylus body signal is transmitted only when the stylus is proximate to the touch display 9. In an embodiment, the stylus body signal is transmitted only when the stylus is in physical contact with the touch display 9.

The user's hand 10 holding the stylus 12 conducts the stylus body signal to the touch display 9 through interaction with the hand 10 of the user with the touch display 9. This enables the touch display 9 to be able to distinguish between touches from the hand 10 and interaction with the stylus 12 by determining which frequency orthogonal signal is received. In an embodiment, touch processing components, e.g., a signal processor for processing the column signals of the touch display 9, detect the stylus body signal infused into the user's hand 10 at locations where the hand 10 is proximate to or touching the touch screen 9. In an embodiment, touch processing components identify the stylus-holding hand 10. In an embodiment, touch processing components identify coupling changes resulting from touch by the hand holding the stylus 12. In an embodiment, touch processing components filter or ignore touch by the stylus-holding hand. In an embodiment, by infusing a user's hand 10 with a signal the touch display 9 discriminates and/or filter out touch events caused by the hand 10 holding the stylus 12. In an embodiment, by infusing a user's hand 10 with a signal, the touch display 9 is able to use touch events caused by the hand 10 holding the stylus 12 in order to input commands or interact with the touch display 9 in other ways. In an embodiment, by infusing a user's hand 10 with a signal, the touch display 9 is able to ignore or filter out touch events caused by the hand 10 and use touch events caused by the hand 10 to input commands or interact with the touch display 9 in other ways.

Figure 3:
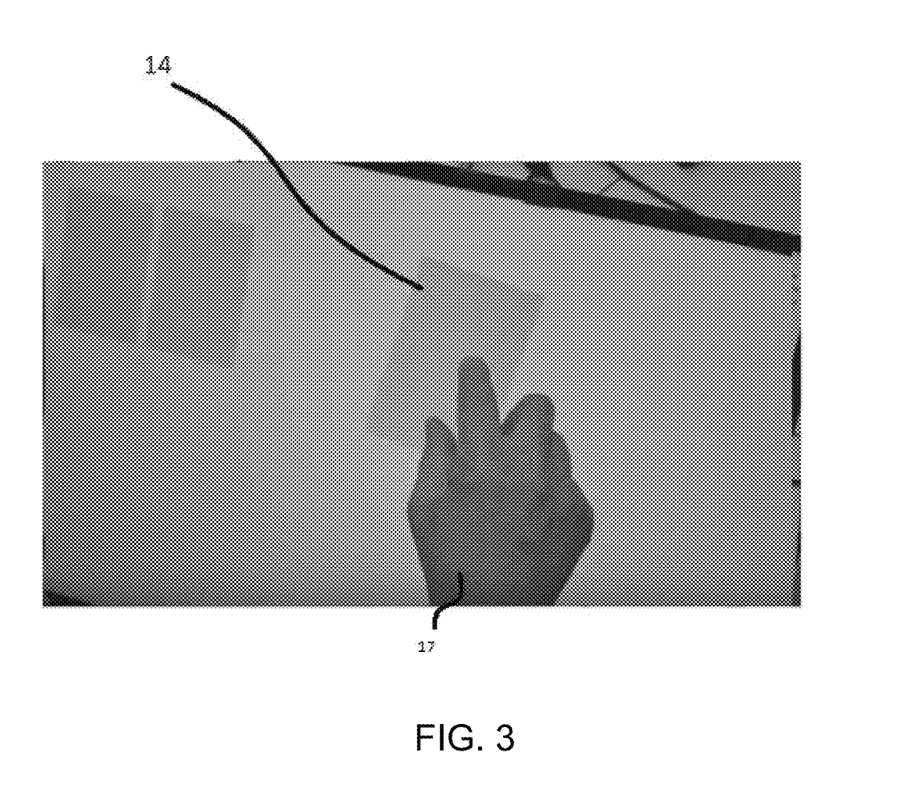
FIG. 3 shows an interactive component being manipulated with touch.

FIG. 3 shows a user's hand 17 manipulating an interactive component 14 without the use of a stylus. In an embodiment, the interactive component 14 can be manipulated in two dimensions. In an embodiment, the hand 17 is able to translate, rotate and scale the interactive component 14. In an embodiment, the interactive component 14 can be manipulated as a three dimensional object on a two-dimensional surface. In an embodiment, the interactive component 14 is able to be manipulated in more than one dimension. In an embodiment, various commands can be inputted via the use of the hand 17 to the interactive component 14.

Figure 4:
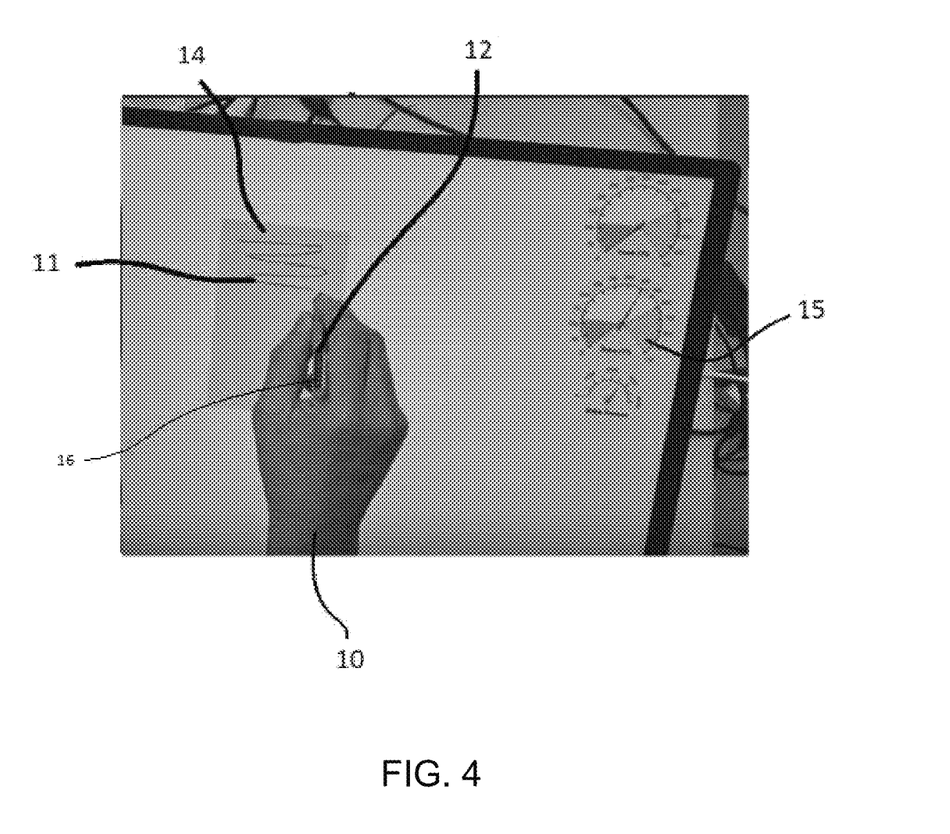
FIG. 4 shows a stylus being used with an interactive touch screen.

FIG. 4 shows a user's hand 10 holding a stylus 12. The stylus 12 has a conductive portion 16 through which the user is able to have signal transmitted from the stylus 12 into the hand 10. The user is drawing lines 11 on the interactive component 14 using the stylus 12. On the right hand side of the touch display 9, gauges 15 are showing graphical depictions of a frame per second metric for each of the touch and stylus activities.

In FIG. 4 the gauges 15 show the frames per second that are being implemented while detecting signals from of the stylus 12 and a user's hand 10 when interacting with the touch display 9. That is to say the speed at which each signal is able to be detected and measured. In an embodiment, the stylus 12 and the hand 10 are able to interact with the touch screen at at least 400 frames per second. It should be understood that the interactions can occur at lower frame rates as well. Within the context of this description, the higher the frame rate the better. In an embodiment, a free hand is able to interact with the touch display at up to 400 frames per second or more. In an embodiment, both the free hand and the stylus are able to interact with the touch display at high frame rates. In an embodiment, both the free hand and the stylus are able to interact with the touch display at more than 300 frames per second. In an embodiment, both the free hand and the stylus are able to interact with the touch display at more than 400 frames per second. In an embodiment, both the free hand and the stylus are able to interact with the touch display at more than 100 frames per second. In an embodiment, both the free hand and the stylus are able to interact with the touch display at more than 200 frames per second. In an embodiment, both the free hand and the stylus are able to interact with the touch display at more than 400 frames per second.

Figure 5:
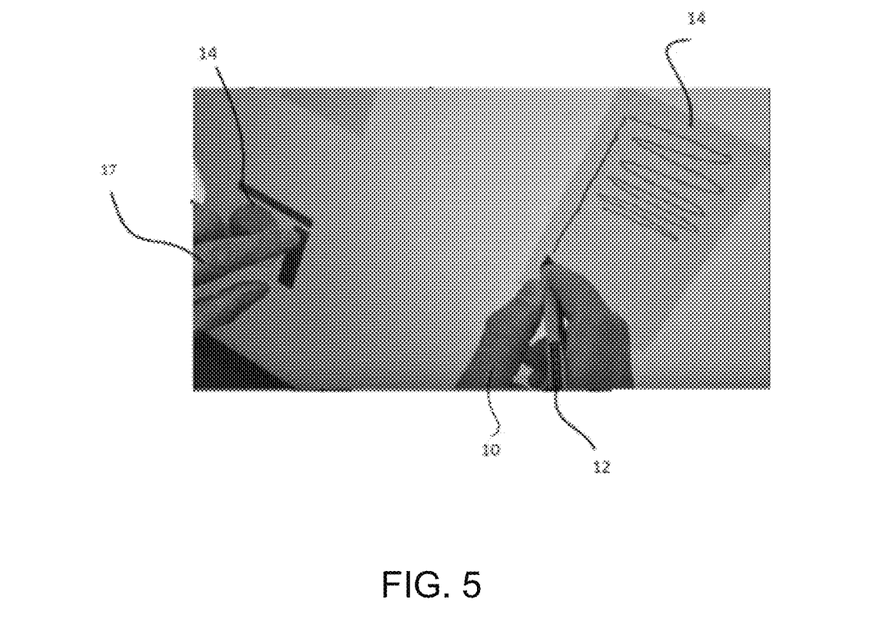
FIG. 5 shows simultaneous interaction with a touch screen using both touch and stylus.

In FIG. 5, a user is drawing on the interactive component 14, a notepad, with the stylus 12 that is held in the hand 10. The ink emitted from the stylus 12 changes color via the interactions the user has with another interactive component 14, a color dial that is manipulated with the other hand 17. The touch display 9 is able to detect interactions with the stylus 12 and the multiple interactive components 14 simultaneously. In an embodiment, the touch display 9 is able to discriminate between which of the hands and stylus are being used. In an embodiment, the other hand 17 interacts with the touch display 9 through capacitive interaction with the row conductors and column conductors implemented in the touch display 9. In an embodiment, other hand 17 may have a signal infused into it via a separate transmitter operably attached to the user that is electrically isolated from the hand 10. In an embodiment, other hand 17 has the same signal transmitted into it via the conductive portion of the stylus 12 (via the transmission of the signal through the body) and the touch display 9 distinguishes the hand 10 and the hand 17 via the magnitude of the measured signal. In an embodiment, other hand 17 has the same signal transmitted into it via the conductive portion of the stylus 12 (via the transmission of the signal through the body) and the touch display 9 distinguishes the hand 10 and the hand 17 via the movements made by the respective hand.

The user's hand 17 can interact with the interactive component 14, while the user is also drawing on the interactive object 14 with the stylus 12. The interaction with the interactive object 14 and the stylus 12 may be simultaneous. The user may change the ink color of the stylus 12 while the user is drawing on the interactive component 14. This can create a variety of different options when performing graphical arts tasks. The user may erase digital ink from the interactive object 14 using one of the hands while still drawing with the stylus 12.

Other features and aspects of the stylus may be changed via interactive components. In an embodiment, font size, brush types, strokes, hues, tints, shadows, etc. are manipulated and changed while using a stylus. During the creation of an artistic project a user can create a variety of different effects and features all through interaction with the touch display. The interactions can occur seamlessly and simultaneously.

Figure 6:
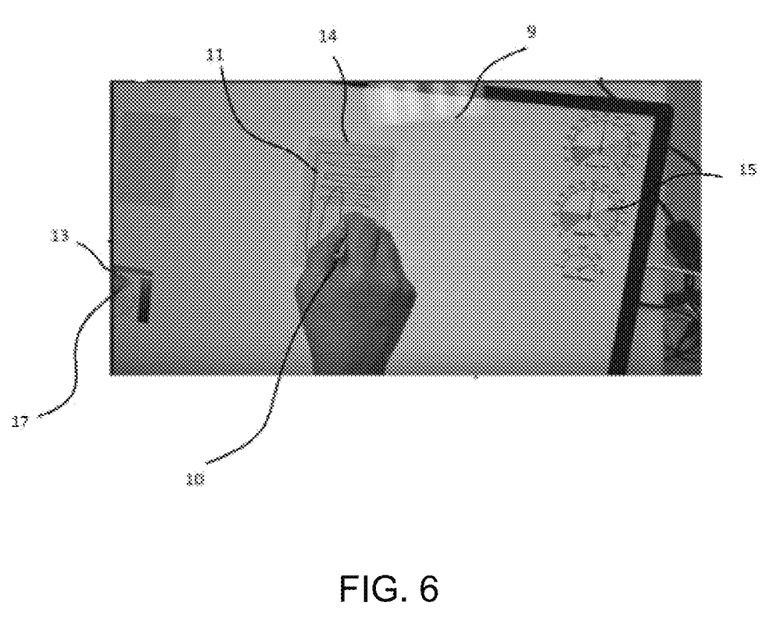
FIG. 6 is another view illustrating simultaneous interaction with a touch screen.

FIG. 6, shows a user drawing on the interactive component 14 with the stylus 12. A user is interacting with another interactive component 14 with hand 17 and also drawing on the interactive object 14 with the stylus 12. The gauges 15 shown to the right of the touch display 9 show how the interactions are both being performed at high frame rate. In the view shown in FIG. 6 the frame rate for both the hand 10 and the stylus 12 operating simultaneously is approximately 350 frames per second. This illustrates that interaction with the touch screen via multiple simultaneous touch events does not result in a significant loss of frame rate.

An embodiment of the disclosure is a system comprising a touch display comprising a plurality of first conductors and a plurality of second conductors, wherein the plurality of first conductors are operably connected to a signal generator, wherein the plurality of first conductors have a plurality of first signals transmitted thereon, wherein each of the plurality of first signals is frequency orthogonal to each other of the plurality of first signals, wherein each of the plurality of second conductors is operably connected to a signal processor; a stylus adapted to transmit a second signal that is frequency orthogonal to each of the plurality of first signals transmitted on the plurality of first conductors, wherein the stylus further comprises a conductive portion adapted to be electrically connected to a user when using the stylus; and wherein the signal processor is adapted to process signals received by the plurality of second conductors and determine measurements corresponding to touch events and interaction of the stylus with the touch display, wherein the determined measurements permit the touch display to distinguish touch events from a hand of the user holding the stylus from a free hand interacting with the touch display, wherein touch events from the hand of the user holding the stylus and the free hand interacting with the touch display can be distinguished when both occur simultaneously.

Another aspect of the disclosure is a touch display comprising: a plurality of first conductors, wherein the plurality of first conductors are operably connected to a signal generator, wherein the plurality of first conductors have a plurality of first signals transmitted thereon, wherein each of the plurality of first signals is frequency orthogonal to each other of the plurality of first signals, a plurality of second conductors, wherein each of the plurality of second conductors is operably connected to a signal processor; and a signal processor adapted to process signals received by the plurality of second conductors and determine measurements corresponding to touch events and interaction with a stylus, wherein the stylus is adapted to transmit a second signal that is frequency orthogonal to each of the plurality of first signals transmitted on the plurality of first conductors, wherein the stylus further comprises a conductive portion adapted to be electrically connected to a user when using the stylus with the touch display, wherein the determined measurements permit the touch display to distinguish touch events from a hand of the user holding the stylus from a free hand interacting with the touch display, wherein touches from the hand of the user holding the stylus and the free hand interacting with the touch display can be distinguished when both occur simultaneously.

The several embodiments discussed above illustrate a variety of systems employing touch screens, but are not intended to limit the scope of the claims. Other systems will become apparent to persons of skill in the art in view of this disclosure, and are thus included within the scope of this disclosure.

While the invention has been particularly shown and described with reference to a preferred embodiment thereof, it will be understood by those skilled in the art that various changes in form and details may be made therein without departing from the spirit and scope of the invention.

The invention claimed is:

1. A system comprising:
a touch display comprising a plurality of first conductors and a plurality of second conductors, wherein the plurality of first conductors are operably connected to a signal generator, wherein the plurality of first conductors have a plurality of first signals transmitted thereon, wherein each of the plurality of first signals is frequency orthogonal to each other of the plurality of first signals, wherein each of the plurality of second conductors is operably connected to a signal processor;
a stylus adapted to transmit a second signal that is frequency orthogonal to each of the plurality of first signals transmitted on the plurality of first conductors, wherein the stylus further comprises a conductive portion adapted to be electrically connected to a user when using the stylus, wherein a third signal is transmitted via the conductive portion of the stylus to the user when using the stylus, wherein the third signal is frequency orthogonal to the second signal and each of the plurality of first signals; and
wherein the signal processor is adapted to process signals received by the plurality of second conductors and determine measurements corresponding to touch events and interaction of the stylus with the touch display, wherein the determined measurements permit the touch display to distinguish touch events from a hand of the user holding the stylus from a free hand interacting with the touch display, wherein touch events from the hand of the user holding the stylus and the free hand interacting with the touch display can be distinguished when both occur simultaneously.

2. The system of claim 1, wherein the second signal transmitted from the stylus and each of the plurality of first signals transmitted on each of the plurality of first conductors are transmitted simultaneously.

3. The system of claim 1, wherein the second signal is one of a plurality of second signals transmitted from the stylus, wherein each of the plurality of second signals is frequency orthogonal to each other of the plurality of second signals.

4. The system of claim 1, wherein the determined measurements from the hand of the user using the stylus are used to negate touch events made by the hand of the user using the stylus while holding the stylus.

5. The system of claim 1, wherein the determined measurements from the hand of the user using the stylus are used to provide additional interactions with the touch display by the hand of the user using the stylus while holding the stylus.

6. The system of claim 1, wherein the frame rate per second of the touch display during a simultaneous touch event and stylus interaction is greater than 300 frames per second.

7. The system of claim 1, the touch display is adapted to process touch events from the hand of the user holding the stylus, the free hand touching the touch display and the stylus simultaneously.

8. The system of claim 1, wherein the conductive portion of the stylus provides a source of ground when being held by a user.

9. A touch display comprising:
a plurality of first conductors, wherein the plurality of first conductors are operably connected to a signal generator, wherein the plurality of first conductors have a plurality of first signals transmitted thereon, wherein each of the plurality of first signals is frequency orthogonal to each other of the plurality of first signals,
a plurality of second conductors, wherein each of the plurality of second conductors is operably connected to a signal processor; and
a signal processor adapted to process signals received by the plurality of second conductors and determine measurements corresponding to touch events and interaction with a stylus, wherein the stylus is adapted to transmit a second signal that is frequency orthogonal to each of the plurality of first signals transmitted on the plurality of first conductors, wherein the stylus further comprises a conductive portion adapted to be electrically connected to a user when using the stylus with the touch display, wherein a third signal is transmitted via the conductive portion of the stylus to user when using the stylus and the signal processor is adapted to process the third signal when received, wherein the third signal is frequency orthogonal to the second signal and each of the plurality of first signals, wherein the determined measurements permit the touch display to distinguish touch events from a hand of the user holding the stylus from a free hand interacting with the touch display, wherein touches from the hand of the user holding the stylus and the free hand interacting with the touch display can be distinguished when both occur simultaneously.

10. The touch display of claim 1, wherein the second signal transmitted from the stylus and each of the plurality of first signals transmitted on each of the plurality of first conductors are transmitted simultaneously.

11. The touch display of claim 1, wherein the second signal is one of a plurality of second signals transmitted from the stylus, wherein each of the plurality of second signals is frequency orthogonal to each other of the plurality of second signals.

12. The touch display of claim 1, wherein the determined measurements from the hand of the user using the stylus are used to negate touch events made by the hand of the user using the stylus while holding the stylus.

13. The touch display of claim 1, wherein the determined measurements from the hand of the user using the stylus are used to provide additional interactions with the touch display by the hand of the user using the stylus while holding the stylus.

14. The touch display of claim 1, wherein the frame rate per second of the touch display during a simultaneous touch event and stylus interaction is greater than 300 frames per second.

15. The touch display of claim 1, the touch display is adapted to process touch events from the hand of the user holding the stylus, the free hand touching the touch display and the stylus simultaneously.

16. The touch display of claim 1, wherein the conductive portion of the stylus provides a source of ground when being held by a user.

* * * * *